United States Patent
Macwan (10) Patent No.: US 9,894,172 B2
(45) Date of Patent: *Feb. 13, 2018

(54) METHOD AND APPARATUS FOR LOCATION-BASED, JUST IN TIME SOCIAL NETWORKING

(71) Applicant: AT&T Intellectual Property I, L.P., Atlanta, GA (US)

(72) Inventor: Sanjay Macwan, Marlboro, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/224,573

(22) Filed: Jul. 31, 2016

(65) Prior Publication Data

US 2016/0344829 A1    Nov. 24, 2016

Related U.S. Application Data

(63) Continuation of application No. 13/782,879, filed on Mar. 1, 2013, now Pat. No. 9,413,832, which is a continuation of application No. 12/566,476, filed on Sep. 24, 2009, now Pat. No. 8,392,500.

(51) Int. Cl.
| | |
|---|---|
| *G06F 15/16* | (2006.01) |
| *H04L 29/08* | (2006.01) |
| *G06Q 30/02* | (2012.01) |
| *H04L 12/58* | (2006.01) |
| *H04W 4/02* | (2009.01) |
| *H04W 4/14* | (2009.01) |

(52) U.S. Cl.
CPC ............ *H04L 67/22* (2013.01); *G06Q 30/02* (2013.01); *H04L 51/04* (2013.01); *H04L 51/32* (2013.01); *H04W 4/023* (2013.01); *H04W 4/14* (2013.01)

(58) Field of Classification Search
CPC .............................. H04L 67/22; H04L 51/32
See application file for complete search history.

(56) References Cited

U.S. PATENT DOCUMENTS

| | | | |
|---|---|---|---|
| 7,519,667 B1 | 4/2009 | Capps | |
| 9,413,832 B2 | 8/2016 | Macwan | |
| 2003/0093405 A1* | 5/2003 | Mayer | G06F 17/30864 |
| 2005/0048961 A1* | 3/2005 | Ribaudo | H04M 3/42348 |
| | | | 455/419 |
| 2007/0016689 A1 | 1/2007 | Birch | |
| 2008/0133671 A1 | 6/2008 | Kalaboukis | |
| 2010/0056183 A1 | 3/2010 | Oh | |
| 2011/0047471 A1 | 2/2011 | Lord et al. | |
| 2011/0196923 A1 | 8/2011 | Marcucci et al. | |

* cited by examiner

*Primary Examiner* — Hua Fan (57) ABSTRACT

In one embodiment, the present disclosure is a method and apparatus for location-based, just in time social networking. In one embodiment, a method for providing a social network includes receiving a request from a first user of the social network to provide information from a location of interest specified by the first user, and locating a group comprising at least one other user of the social network, where each of the at least one other user is currently at the location of interest and has volunteered to provide information from the location of interest, wherein the group is selected from a larger group of other users who are at a plurality of locations of interest.

20 Claims, 6 Drawing Sheets

METHOD AND APPARATUS FOR LOCATION-BASED, JUST IN TIME SOCIAL NETWORKING

This application is a continuation of U.S. patent application Ser. No. 13/782,879, filed Mar. 1, 2013, now U.S. Pat. No. 9,413,832, which is a continuation of U.S. patent application Ser. No. 12/566,476, filed Sep. 24, 2009, now U.S. Pat. No. 8,392,500, all of which are herein incorporated by reference in its entirety.

FIELD OF THE DISCLOSURE

The present disclosure relates generally to social networks and relates more particularly to location-based, just in time social networks.

BACKGROUND

It is desirable in many situations to get real-time, just in time (i.e., substantially immediately when needed) information from a location; however, there are few convenient ways of obtaining the needed information in a timely manner.

For example, a family may be considering a trip to a local museum. The decision to go may depend on several factors, such as how crowded the museum is, which prominent exhibits may be open or closed, how much parking is available, or how heavy the traffic approaching the museum is. The family could call the museum, but they may receive only pre-recorded information. If the family is unable to speak to a live person, they may not be able to obtain the most current contextual or "opinion-based" information that will help them make their decision.

Other situations in which a person may require real-time, just in time information from a location might include: trying to gauge delays at an airport, such as the lengths of the check-in and security lines; trying to find information about an unfolding event that has little or no media coverage; or simple curiosity.

SUMMARY

In one embodiment, the present disclosure is a method and apparatus for location-based, just in time social networking. In one embodiment, a method for providing a social network includes receiving a request from a first user of the social network to provide information from a location of interest specified by the first user, and locating a group comprising at least one other user of the social network, where each of the at least one other user is currently at the location of interest and has volunteered to provide information from the location of interest, wherein the group is selected from a larger group of other users who are at a plurality of locations of interest.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one embodiment, the present disclosure is a method and apparatus for location-based, just in time social networking. Embodiments of the disclosure provide a means for users to identify and connect to other users at a location of interest, where the users at the location of interest have volunteered to provide real-time, just in time information. The real-time, just in time social network established in accordance with the present disclosure is ad-hoc in that the users do not need to know each other, or invite each other to be part of their social networks, before communicating to share information. The users identify and connect to each other when they need to, ad hoc, just in time, and, in some embodiments, completely anonymously.

Figure 1:
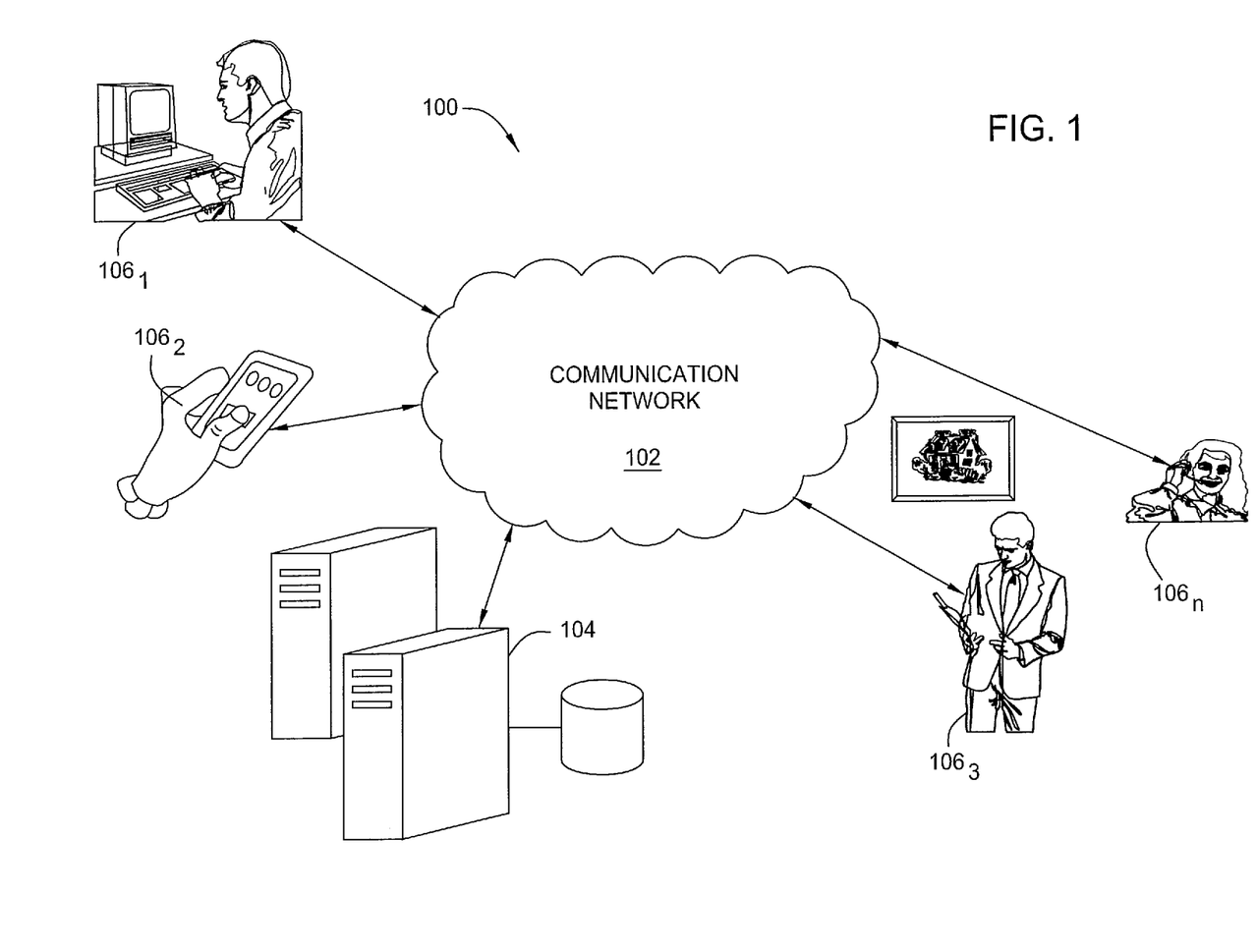
FIG. 1 is a schematic diagram illustrating an exemplary social network according to embodiments of the present disclosure.

FIG. 1 is a schematic diagram illustrating an exemplary social network 100 according to embodiments of the present disclosure. As illustrated, the social network 100 comprises a communication network 102, a social networking application 104 connected to the communication network 102, and a plurality of users $106_1$-$106_n$ (hereinafter collectively referred to as "users 106") connected to the communication network 102.

The communication network 102 is any kind of network that facilitates communications between remote users and between users and remote applications. For example, the communication network 102 may include one or more of: a computer network (e.g., a local area network, a wide area network, a virtual private network), the Internet, the public switched telephone network, a peer-to-peer network, a cellular network, a packet network, or the like.

The users 106 connect to the communication network 102 via one or more communication devices. These communication devices may include, for example: landline telephones, cellular telephones, personal digital assistants, personal computers, laptop computers, personal media players, gaming consoles, set top boxes, or the like. Using these communication devices, the users 106 are able to connect to each other and to the social networking application 104 via the communication network 102.

In one embodiment, the social networking application 104 comprises a web portal that hosts a real-time, just in time social networking application. In one embodiment, the web portal is implemented in one or more devices such as servers, databases, or the like. In addition, the web portal comprises technology for tracking user locations, such as one or more global positioning system devices or radio towers. In one embodiment, the social networking application 104 is accessed over the communication network 102 via one or more uniform resource locators.

As discussed in further detail below, the users 106 access the social networking application 104 via the communication network 102. Using the social networking application 104, the users 106 are able to identify other users 106 at various locations of interest who have volunteered to provide real-time, just in time information (broadly defined as information that is substantially immediately needed or information that is provided substantially immediately as requested to reflect a current state, e.g., at a location of interest) regarding the locations of interest. Having used the social networking application 104 to identify these other users 106, the users 106 may then connect directly to each other via the communication network 102, or the users 106 may communicate using the social networking application 104 as an intermediary.

Figure 2:
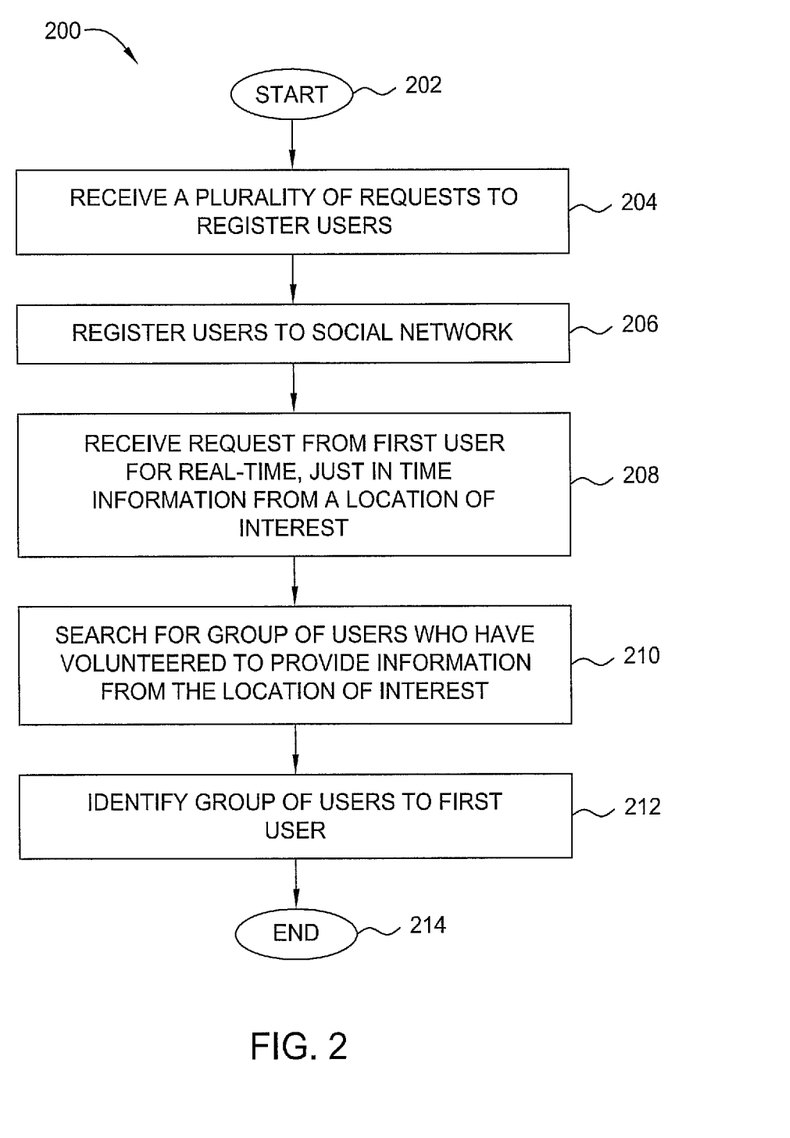
FIG. 2 is a flow diagram illustrating a first embodiment of a method for providing a location-based, just in time social network, according to the present disclosure.

FIG. 2 is a flow diagram illustrating a first embodiment of a method 200 for providing a location-based, just in time social network, according to the present disclosure. Specifically, the method 200 enables users to identify each other and to connect directly to each other to exchange real-time, just in time information. The method 200 may be executed, for example, by the social networking application 104 illustrated in FIG. 1. As such, reference is made within the context of the method 200 to various components of the social network 100 illustrated in FIG. 1. It will be appreciated, however, that the method 200 is not limited to execution within the social network 100 and may, in fact, have application in networks that are configured in alternative manners.

The method 200 is initialized at step 202 and proceeds to step 204, where the social networking application 104 receives a plurality of requests to register users 106. By registering with the social networking application 104, the users 106 indicate a desire to join the social network 100. For example, one or more of the users 106 may wish to join the social network so that they can obtain real-time, just in time information regarding a location of interest. Alternatively, one or more of the users 106 may wish to join the social network so that they can provide real-time, just in time information to other users 106. In step 206, the social networking application 104 registers the users 106 to the social network 100.

In step 208, the social networking application 104 receives a request from a first user 106 for real-time, just in time information from a location of interest. In one embodiment, the location of interest is a physical location, such as an establishment or street address. In one embodiment, the request comprises a selection by the first user (e.g., from a menu or a free-form field) of the location of interest. For instance, the user might select "Times Square, New York" or "The Rock and Roll Hall of Fame" from a menu of pre-populated entries, or might enter a specific street address into a free-form field. Referring to FIG. 1, for example, user $106_1$ may send a request from his home computer for real-time, just in time information from a local art museum. In one embodiment, the first user sends the request by accessing a portal.

In step 210, the social networking application 104 searches for a group of one or more users 106 who have volunteered to provide real-time, just in time information from the location of interest. It should be noted that the group is selected from a larger group of other users who are located at a plurality of different locations. Thus, the located group of other users is a subset of the larger group of other users. The method 200 then proceeds to step 212, where the social networking application 104 identifies the group of users to the first user. For example, referring again to FIG. 1, the social networking application 104 may determine that users $106_3$ and $106_n$ have volunteered to provide real-time, just in time information from the local art museum. In this case, the social networking application will identify users $106_3$ and $106_n$ to the first user.

The method 200 then terminates in step 214. At this point, the first user may select one or more volunteers from the group of volunteers to whom to connect directly, as discussed in further detail with respect to FIGS. 3 and 4.

The real-time, just in time social network provided in accordance with the method 200 is ad-hoc in that the users 106 do not need to know each other, or invite each other to be part of their social networks, before communicating to share information. Users 106 identify and connect to each other when they need to, ad hoc, just in time, and, in some embodiments, completely anonymously.

Figure 3:
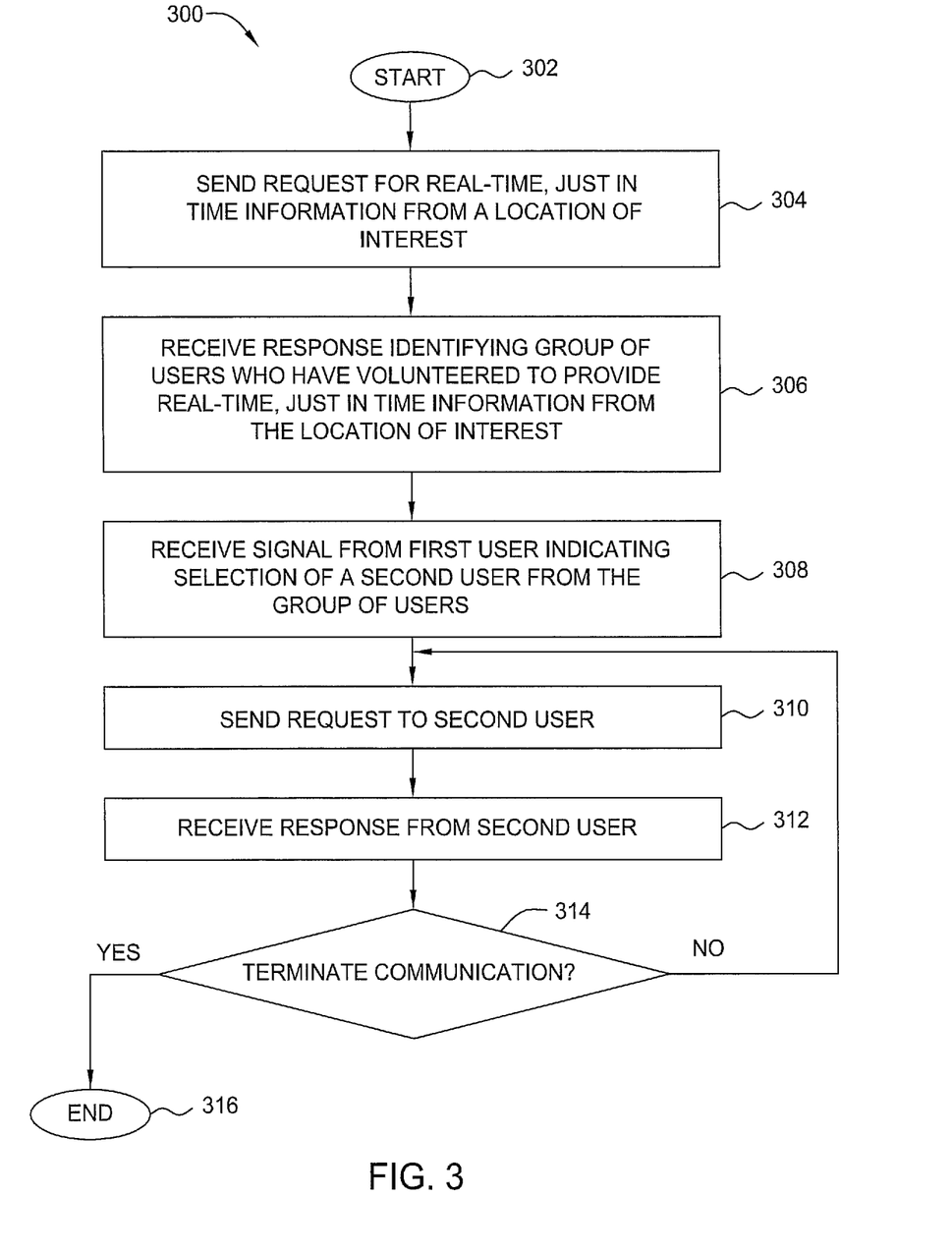
FIG. 3 is a flow diagram illustrating one embodiment of a method for requesting location-based, just in time information, according to the present disclosure.

FIG. 3 is a flow diagram illustrating one embodiment of a method 300 for requesting location-based, just in time information, according to the present disclosure. The method 300 assumes that several users have already registered as users with a real-time, just in time social networking application, such as the social networking application 104 described in FIGS. 1 and 2. The method 300 may be executed, for example, by a communication device used by one of the users 106 illustrated in FIG. 1. As such, reference is made within the context of the method 300 to various components of the social network 100 illustrated in FIG. 1. It will be appreciated, however, that the method 300 is not limited to execution within the social network 100 and may, in fact, have application in networks that are configured in alternative manners.

The method 300 is initialized in step 302 and proceeds to step 304, where a communication device used by a first user 106 (e.g., user $106_1$ of FIG. 1) sends a request to the social networking application 104 for real-time, just in time information from a location of interest. For example, as described above, user $106_1$ of FIG. 1 may send a request from his home computer for real-time, just in time information from a local art museum. In one embodiment, the request is sent via a portal.

In step 306, the communication device receives a response from the social networking application 104, where the response identifies to the communication device a group of one or more users 106 who have volunteered to provide real-time, just in time information from the location of interest. For example, as discussed above, the response may identify users $106_3$ and $106_n$ of FIG. 1 as being willing to provide real-time, just in time information from the location of interest.

In step 308, the communication device receives a signal from the first user 106 indicating a selection of a second user 106 from the group of users. The signal indicates that the first user 106 wishes to initiate a communication with the second user 106 to obtain the requested real-time, just in time information. For instance, referring again to FIG. 1, the signal may indicate that the first user $106_1$ wishes to communicate with user $106_3$, who is currently at the art museum. The signal may be received from the first user via any one or more of a plurality of modalities, including a tactile modality (e.g., pushing a button on the communication device or on a graphical user interface on a display of the communication device), an audio modality (e.g., issuing a verbal command to the communication device), or a visual modality (e.g., gesturing a command to the communication device).

In step 310, the communication device sends a request to the second user. For example, the request may comprise a telephonic communication, a short message service (SMS) communication, or a multimedia messaging system (MMS) communication. The request requests that the second user 106 communicate with the first user 106 and may additionally include the specific real-time, just in time information that the first user 106 wishes to obtain. In one embodiment, the request is sent directly to the second user. In another embodiment, the request is sent to the second user via the social networking application 104, which serves as an intermediary. One embodiment of a method in which the social networking application 104 acts as a communication intermediary is discussed in greater detail in connection with FIG. 5

In step 312, the communication device receives a response from the second user 106. For example, the response may comprise a telephonic communication, a short message service (SMS) communication, or a multimedia messaging system (MMS) communication. The request indicates whether the second user 106 agrees to communicate with the first user 106 and may additionally include specific real-time, just in time information requested by the first user 106. In one embodiment, the response is received directly from the second user. In another embodiment, the response is received via the social networking application 104, which serves as an intermediary.

In step 314, the communication device determines whether to terminate the communication between the first user 106 and the second user 106. In one embodiment, this determination is made in accordance with a signal received from the first user 106 (e.g., a signal indicating that the communication with the second user 106 should terminate). The signal may be received from the first user via any one or more of a plurality of modalities, including a tactile modality (e.g., pushing a button on the communication device or on a graphical user interface on a display of the communication device), an audio modality (e.g., issuing a verbal command to the communication device), or a visual modality (e.g., gesturing a command to the communication device).

If the communication device concludes in step 314 that the communication between the first user 106 and the second user 106 should not terminate, the method 300 returns to step 310 and proceeds as described above, such that the communication device continues to send and receive requests and responses until all of the desired information is obtained. For instance, the first user 106 may obtain all or part of the real-time, just in time information that he or she wishes to obtain over the course of several exchanges with the second user 106 (e.g., through multiple SMS communications).

Alternatively, if the communication device concludes in step 314 that the communication between the first user 106 and the second user 106 should terminate, the method 300 terminates in step 316.

The first user is therefore able to communicate with a user (i.e., the second user) who is currently at a location of interest in order to obtain real-time, just in time information from the location of interest. In this way, the first user can obtain information that is more current and more relevant to his or her inquiry. It will be appreciated that if the first user cannot obtain all of the information he or she wishes to obtain from one user at the location of interest, then the first user may contact one or more other users at the location of interest who have volunteered to provide real-time, just in time information. For example, if user $106_3$ is unable to tell the first user $106_1$ how long the ticket lines at the museum are, the first user $106_1$ may be able to get this information from user $106_n$.

Figure 4:
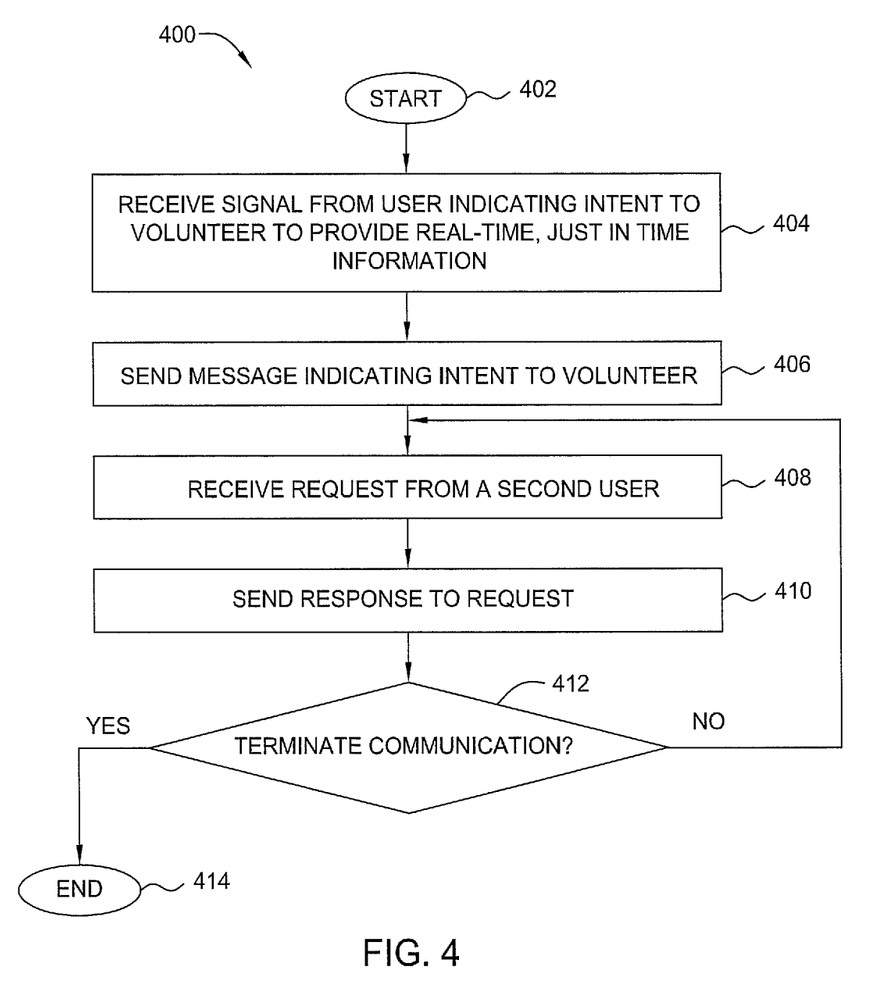
FIG. 4 is a flow diagram illustrating one embodiment of a method for providing location-based, just in time information, according to the present disclosure.

FIG. 4 is a flow diagram illustrating one embodiment of a method 400 for providing location-based, just in time information, according to the present disclosure. The method 400 assumes that several users have already registered as users with a real-time, just in time social networking application, such as the social networking application 104 described in FIGS. 1 and 2. The method 400 may be executed, for example, by a communication device used by one of the users 106 illustrated in FIG. 1. As such, reference is made within the context of the method 400 to various components of the social network 100 illustrated in FIG. 1. It will be appreciated, however, that the method 400 is not limited to execution within the social network 100 and may, in fact, have application in networks that are configured in alternative manners.

The method 400 is initialized in step 402 and proceeds to step 404, where a communication device used by a first user 106 (e.g., user $106_3$ of FIG. 1) receives a signal from the first user indicating an intent to volunteer to provide real-time, just in time information from a location of interest. For instance, referring again to FIG. 1, the signal may indicate that the first user $106_3$ wishes to volunteer to provide real-time, just in time information from the art museum via his mobile phone. The signal may be received from the first user via any one or more of a plurality of modalities, including a tactile modality (e.g., pushing a button on the communication device or on a graphical user interface on a display of the communication device), an audio modality (e.g., issuing a verbal command to the communication device), or a visual modality (e.g., gesturing a command to the communication device).

In step 406, the communication device sends a message indicating the first user's intent to volunteer. For example, the communication device may send the message to the social networking application 104, so that the social networking application 104 is aware of the first user's willingness to provide the real-time, just in time information. In one embodiment, the message is sent via a portal.

In step 408, the communication device receives a request from a second user 106. For example, the request may be from the user $106_1$, who wishes to obtain real-time, just in time information from the art museum. The response may comprise a telephonic communication, a short message service (SMS) communication, or a multimedia messaging system (MMS) communication. In one embodiment, the request asks whether the first user 106 is willing to communicate with the second user 106. In a further embodiment, the request specifically identifies the real-time, just in time information that the second user 106 wishes to obtain (e.g., the length of the line for tickets). In one embodiment, the request is received directly from the second user 106. In another embodiment, the communication is received from the second user 106 via the social networking application 104, which serves as an intermediary.

In step 410, the communication device sends a response to the request. The response indicates whether the first user 106 is willing to communicate with the second user 106 and may additionally include specific real-time, just in time information that the second user 106 wishes to obtain. For example, the response may comprise a telephonic communication, a short message service (SMS) communication, or a multimedia messaging system (MMS) communication. In one embodiment, the response is sent directly to the second user. In another embodiment, the response is sent via the social networking application 104, which serves as an intermediary.

In step 412, the communication device determines whether to terminate the communication between the first user 106 and the second user 106. In one embodiment, this determination is made in accordance with a signal received from the first user 106 (e.g., a signal indicating that the communication with the second user 106 should terminate). The signal may be received from the first user via any one or more of a plurality of modalities, including a tactile modality (e.g., pushing a button on the communication device or on a graphical user interface on a display of the communication device), an audio modality (e.g., issuing a verbal command to the communication device), or a visual modality (e.g., gesturing a command to the communication device). The first user 106 may indicate that the communication should be terminated if he or she has provided all of the real-time, just in time information that he or she can provide to the second user 106.

If the communication device concludes in step 412 that the communication between the first user 106 and the second user 106 should not terminate, the method 400 returns to step 408 and proceeds as described above, such that the communication device continues to send and receive responses and requests until all of the desired information is provided. For instance, the second user 106 may obtain all or part of the real-time, just in time information that he or she wishes to obtain over the course of several exchanges with the first user 106 (e.g., through multiple SMS communications).

Alternatively, if the communication device concludes in step 412 that communication between the first user 106 and the second user 106 should terminate, the method 400 terminates in step 414.

Figure 5:
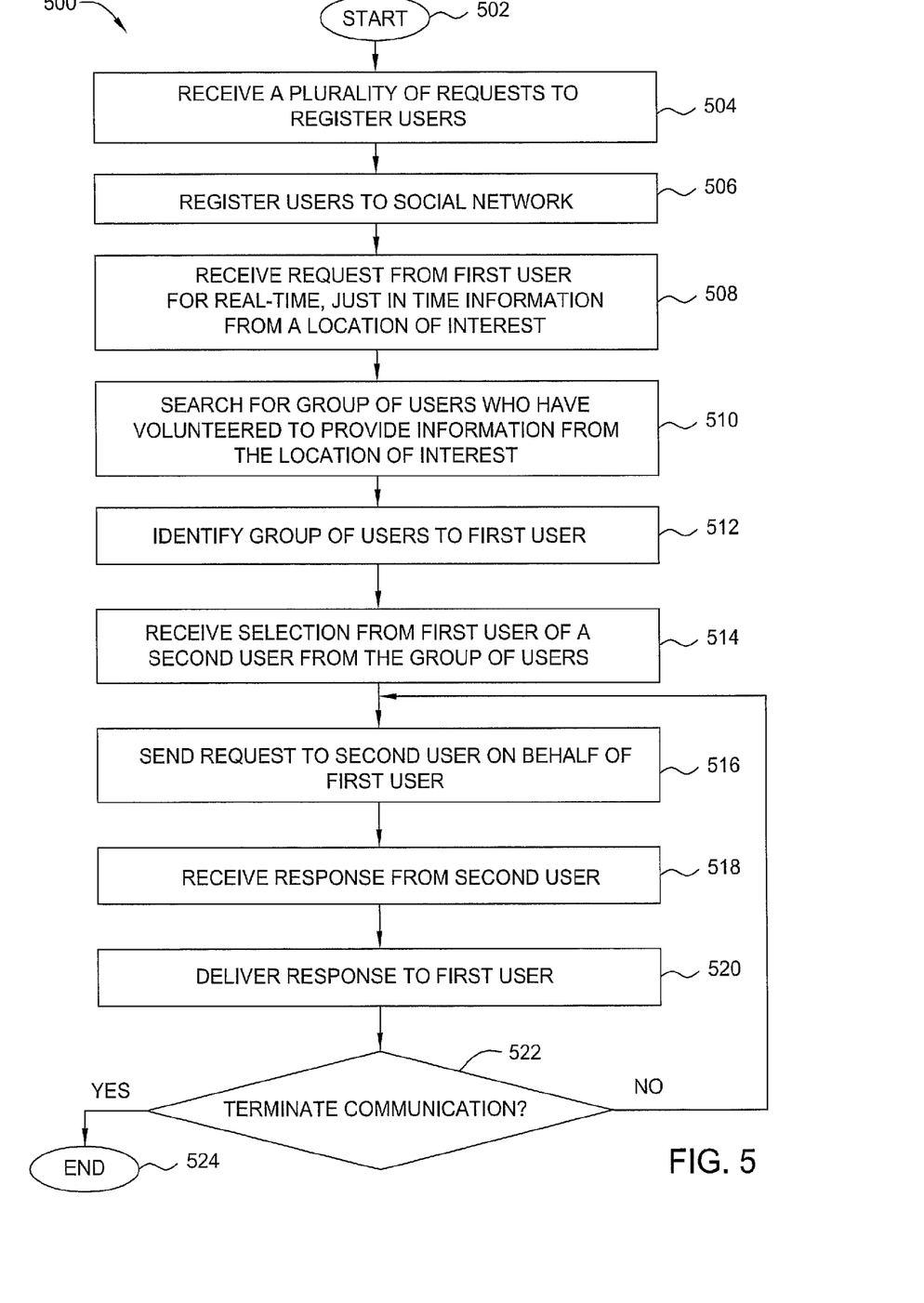
FIG. 5 is a flow diagram illustrating a second embodiment of a method for providing a location-based, just in time social network, according to the present disclosure.

FIG. 5 is a flow diagram illustrating a second embodiment of a method 500 for providing a location-based, just in time social network, according to the present disclosure. The method 500 is substantially similar to the method 200; however, in the case of the method 500, communications between users are brokered by an intermediary rather than exchanged directly. The method 500 may be executed, for example, by the social networking application 104 illustrated in FIG. 1. As such, reference is made within the context of the method 500 to various components of the social network 100 illustrated in FIG. 1. It will be appreciated, however, that the method 500 is not limited to execution within the social network 100 and may, in fact, have application in networks that are configured in alternative manners.

The method 500 is initialized at step 502 and proceeds to step 504, where the social networking application 104 receives a plurality of requests to register users 106. By registering with the social networking application 104, the users 106 indicate a desire to join the social network 100. For example, one or more of the users 106 may wish to join the social network so that they can obtain real-time, just in time information regarding a location of interest. Alternatively, one or more of the users 106 may wish to join the social network so that they can provide real-time, just in time information to other users 106. In step 506, the social networking application 104 registers the users 106 to the social network 100.

In step 508, the social networking application 104 receives a request from a first user 106 for real-time, just in time information from a location of interest. In one embodiment, the request comprises a selection by the first user (e.g., from a menu or a free-form field) of the location of interest. For instance, the user might select "Times Square, New York" or "The Rock and Roll Hall of Fame" from a menu of pre-populated entries, or might enter a specific street address into a free-form field. Referring to FIG. 1, for example, user 106$_1$ may send a request from his home computer for real-time, just in time information from a local art museum. In one embodiment, the first user sends the request by accessing a portal.

In step 510, the social networking application 104 searches for a group of one or more users 106 who are willing to provide real-time, just in time information from the location of interest. The method 500 then proceeds to step 512, where the social networking application 104 identifies the group of users to the first user. For example, referring again to FIG. 1, the social networking application 104 may determine that users 106$_3$ and 106$_n$ have indicated a willingness to provide real-time, just in time information from the local art museum. In this case, the social networking application will identify users 106$_3$ and 106$_n$ to the first user.

In step 514, the social networking application 104 receives a selection from the first user of a second user from the group of users. For example, referring again to FIG. 1, the user 106$_1$ may select user 106$_3$. The method 500 then proceeds to step 516, where the social networking application 104 sends a request to the second user on behalf of the first user. In one embodiment, the request indicates that the first user wishes to communicate with the second user. In a further embodiment, the request identifies the specific real-time, just in time information that the first user wishes to obtain. For example, the request may comprise a telephonic communication, a short message service (SMS) communication, or a multimedia messaging system (MMS) communication.

In step 518, the social networking application 104 receives a response from the second user. The response indicates whether the second user 106 agrees to communicate with the first user 106 and may further include specific real-time, just in time information that the first user 106 wishes to obtain. For example, the response may comprise a telephonic communication, a short message service (SMS) communication, or a multimedia messaging system (MMS) communication. The social networking application 104 then delivers the response to the first user in step 520.

In step 522, the social networking application 104 determines whether the communication between the first user 106 and the second user 106 should terminate. In one embodiment, this determination is made in accordance with a signal received from the first user 106 (e.g., a signal indicating that the communication with the second user 106 should terminate). The first user 106 may indicate that the communication should be terminated if he or she has obtained all of the real-time, just in time information that he or she can obtain from the second user 106.

If the social networking application 104 concludes in step 522 that the communication between the first user 106 and the second user 106 should not terminate, the method 500 returns to step 516 and proceeds as described above, such that the social networking application 104 continues to send and receive requests and responses on behalf of the first user 106 and the second user 106 until all of the desired information is obtained. For instance, the first user 106 may obtain all or part of the real-time, just in time information that he or she wishes to obtain over the course of several exchanges with the second user 106 (e.g., through multiple SMS communications).

Alternatively, if the social networking application 104 concludes in step 522 that the communication between the first user 106 and the second user 106 should terminate, the method 500 terminates in step 524.

The method 500 is therefore substantially similar to the method 200; however, the method 500 preserves the privacy of the users by inserting the social networking application 104 as an intermediary in communications between users. In one embodiment, a service provider who provides the social network 100 may charge a fee to users 106 who wish to use the social networking application 104 as an intermediary (e.g., a flat fee or $0.xy per exchange).

Although FIGS. 2 and 5 illustrate methods in which users 106 use the social networking application 104 to search for and select users at the location of interest, in some embodiments of the present disclosure this step is bypassed. In other words, a user's request for real-time, just in time information may be delivered directly to a user at the location of interest without giving the requesting user the option to select which user at the location of interest will respond.

It is also possible that in some cases, there may be no users currently willing to provide real-time, just in time information from the location of interest. In such a case, the social networking application 104 will inform the requesting user that no users are available at the location of interest.

In one embodiment, a service provider who provides the social network 100 may charge users 106 a fee to access the social network 100. Alternatively, the service provider may provide basic social networking features for free, but charge for extra features such as the ability to use the social networking application 104 as an intermediary in exchanges with other users 106.

In further embodiments, users 106 who register as volunteers to provide real-time, just in time information via the social network 100 may receive some form of compensation for their services (e.g., $0.xy or x credits per response). This compensation may be redeemed, for example, when these users need to use the social network 100 to obtain information. In other embodiments, the service provider may charge a per-transaction fee (e.g., $0.xx per query) for a user seeking information, where a fraction of this fee is shared as compensation with the user who provides the information and the service provider keeps the remainder.

Figure 6:
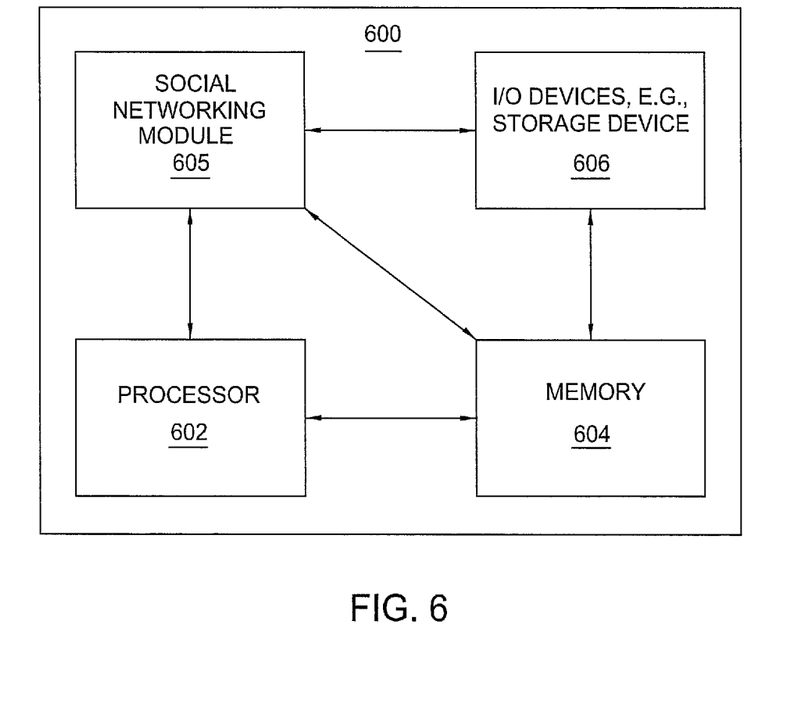
FIG. 6 is a high level block diagram of the social networking method that is implemented using a general purpose computing device.

FIG. 6 is a high level block diagram of the social networking method that is implemented using a general purpose computing device 600. In one embodiment, a general purpose computing device 600 comprises a processor 602, a memory 604, a social networking module 605 and various input/output (I/O) devices 606 such as a display, a keyboard, a mouse, a modem, a stylus, a joystick, a keypad, controller, and the like. In one embodiment, at least one I/O device is a storage device (e.g., a disk drive, an optical disk drive, a floppy disk drive). It should be understood that the social networking module 605 can be implemented as a physical device or subsystem that is coupled to a processor through a communication channel.

Alternatively, the social networking module 605 can be represented by one or more software applications (or even a combination of software and hardware, e.g., using Application Specific Integrated Circuits (ASIC)), where the software is loaded from a storage medium (e.g., I/O devices 606) and operated by the processor 602 in the memory 604 of the general purpose computing device 600. Thus, in one embodiment, the social networking module 605 for providing a real-time, just in time social network described herein with reference to the preceding Figures can be stored on a computer readable storage medium (e.g., RAM, magnetic or optical drive or diskette, and the like).

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying Figures that recite a determining operation or involve a decision, do not necessarily require that both branches of the determining operation be practiced. In other words, one of the branches of the determining operation can be deemed as an optional step.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method comprising:
 sending a first request, by a hardware processor of a device of a second user to a social networking application server of a social network, where the first request from the device of the second user requests that the second user be registered with the social network as being willing to provide information regarding a location of interest, wherein the second user is currently at the location of interest and has volunteered to provide the information regarding the location of interest;
 receiving, by the hardware processor, a second request from the social networking application server that a first user who is not located at the location of interest is to be provided with the information regarding the location of interest, wherein the information regarding the location of interest is specified by the first user; and
 providing, by the hardware processor, the information to the social networking application server regarding the location of interest.

2. The method of claim 1, wherein the location of interest is a physical location.

3. The method of claim 1, further comprising:
 receiving, by the hardware processor, a third request for the information directly from a device of the first user.

4. The method of claim 3, wherein an identification of the second user is provided by the social networking application server to the device of the first user.

5. The method of claim 3, further comprising:
 sending, by the hardware processor, the information directly to the device of the first user responsive to the third request.

6. The method of claim 5, wherein the information is sent directly via a multimedia messaging system communication.

7. The method of claim 5, wherein the information is sent directly via a short message service communication.

8. The method of claim 5, wherein the information is sent via a telephonic communication.

9. A computer readable storage device storing an executable program which when executed by a hardware processor of a device of a second user, cause the hardware processor to perform operations, the operations comprising:
 sending a first request to a social networking application server of a social network, where the first request from the device of the second user requests that the second user be registered with the social network as being willing to provide information regarding a location of interest, wherein the second user is currently at the location of interest and has volunteered to provide the information regarding the location of interest;

receiving a second request from the social networking application server that a first user who is not located at the location of interest is to be provided with the information regarding the location of interest, wherein the information regarding the location of interest is specified by the first user; and providing the information to the social networking application server regarding the location of interest.

10. The computer readable storage device of claim 9, wherein the location of interest is a physical location.

11. The computer readable storage device of claim 9, the operations further comprising:

receiving a third request for the information directly from a device of the first user.

12. The computer readable storage device of claim 11, wherein an identification of the second user is provided by the social networking application server to the device of the first user.

13. The computer readable storage device of claim 11, the operations further comprising:

sending the information directly to the device of the first user responsive to the third request.

14. The computer readable storage device of claim 13, wherein the information is sent directly via a multimedia messaging system communication.

15. The computer readable storage device of claim 13, wherein the information is sent directly via a short message service communication.

16. The computer readable storage device of claim 13, wherein the information is sent via a telephonic communication.

17. A device comprising:

a hardware processor; and a non-transitory computer-readable medium storing a plurality of instructions which, when executed by the hardware processor, causes the hardware processor to perform operations, the operations comprising:

sending a first request to a social networking application server of a social network, where the first request from the device of a second user requests that the second user be registered with the social network as being willing to provide information regarding a location of interest, wherein the second user is currently at the location of interest and has volunteered to provide the information regarding the location of interest;

receiving a second request from the social networking application server that a first user who is not located at the location of interest is to be provided with the information regarding the location of interest, wherein the information regarding the location of interest is specified by the first user; and providing the information to the social networking application server regarding the location of interest.

18. The device of claim 17, wherein the location of interest is a physical location.

19. The device of claim 17, the operations further comprising:

receiving a third request for the information directly from a device of the first user.

20. The device of claim 19, wherein an identification of the second user is provided by the social networking application server to the device of the first user.

* * * * *